Feb. 23, 1954

J. R. ALMOND 2,670,247

RELAY VALVE FOR VACUUM BRAKE SYSTEMS

Filed April 20, 1950

INVENTOR.
JOHN R. ALMOND.
BY
Richey Watts
ATTORNEYS.

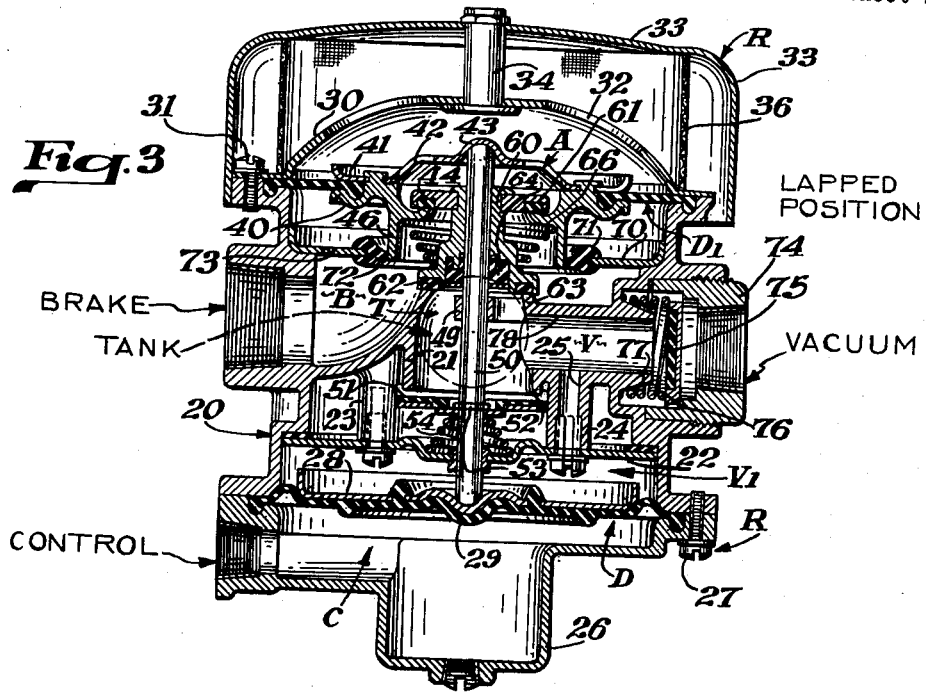
Fig. 3 — LAPPED POSITION
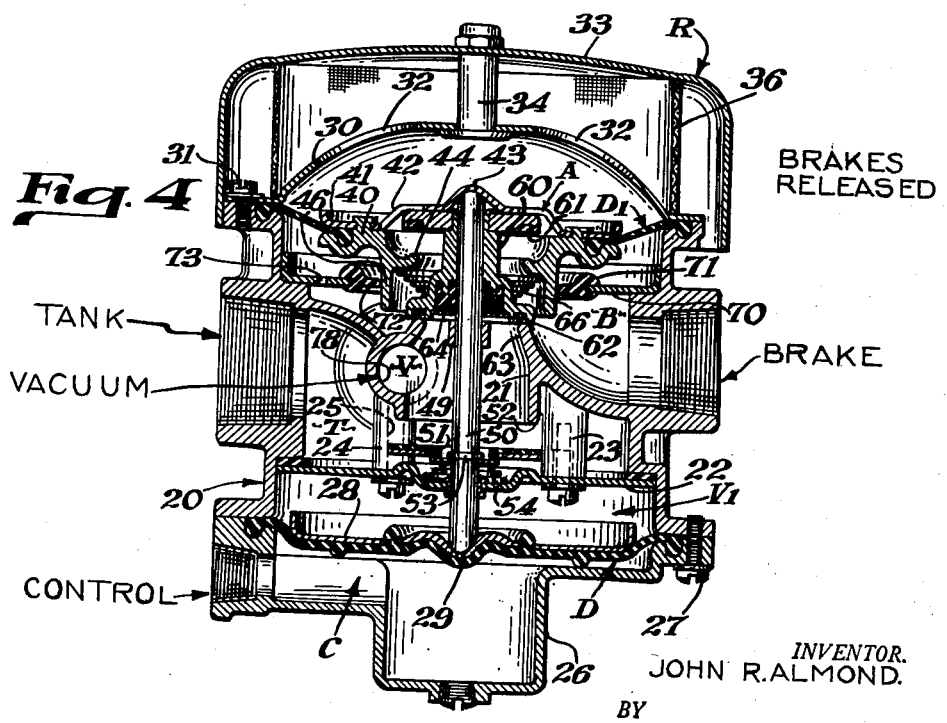
Fig. 4 — BRAKES RELEASED
INVENTOR.
JOHN R. ALMOND.
BY Richey & Watts
ATTORNEYS.

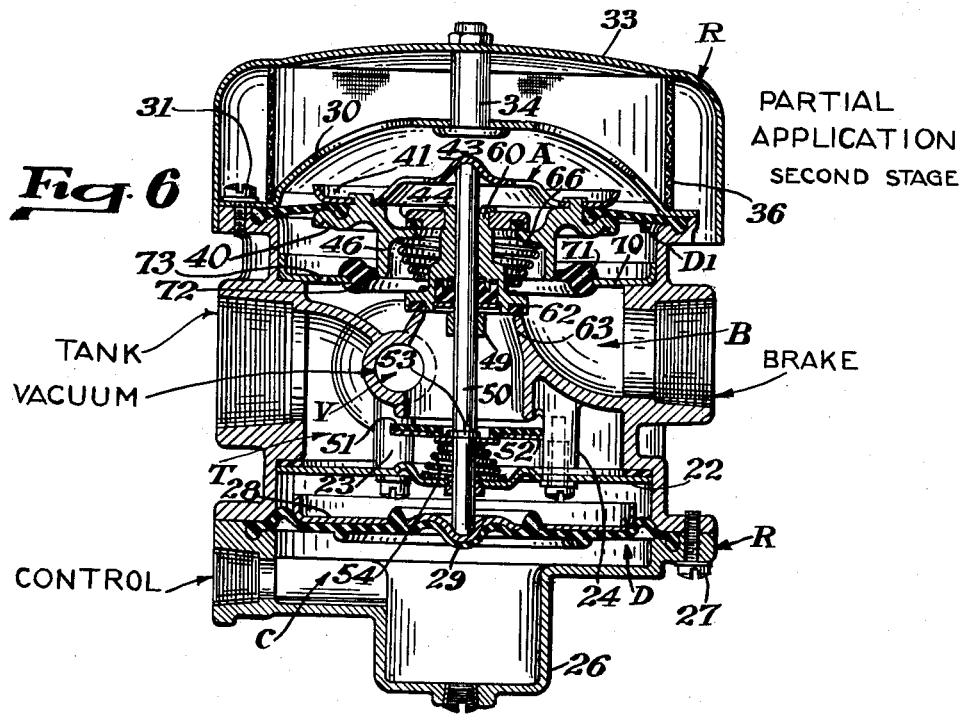
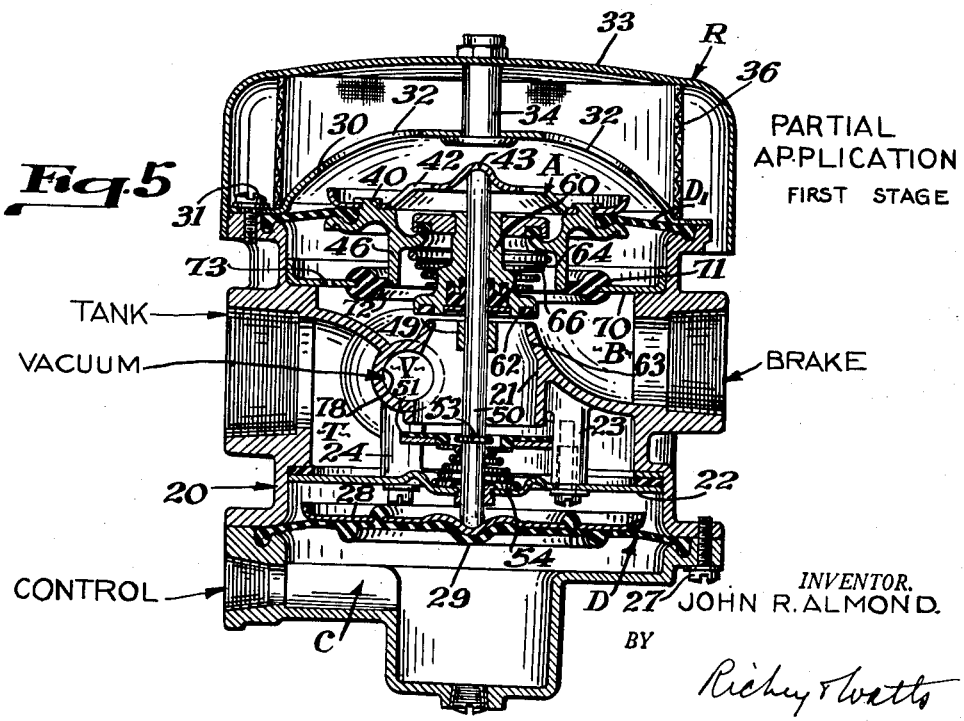

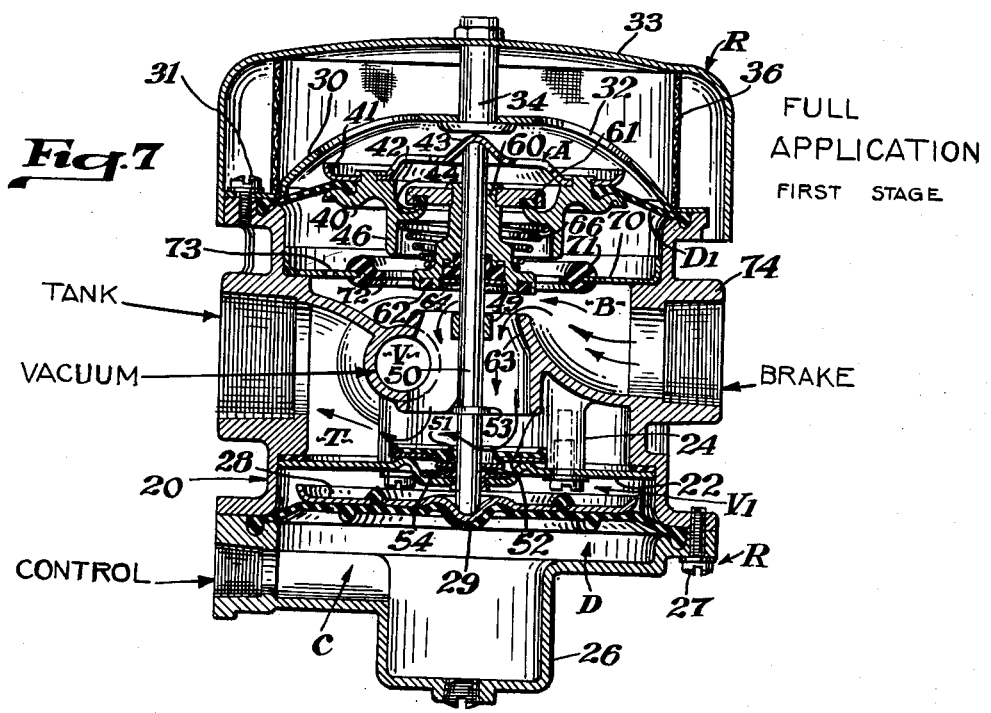
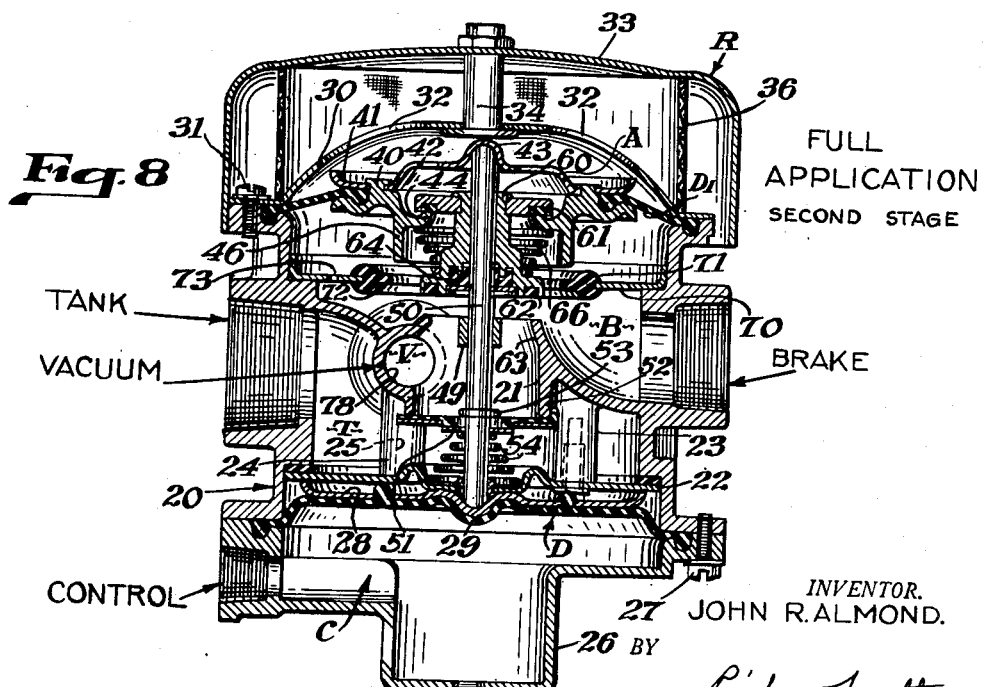

Patented Feb. 23, 1954

2,670,247

UNITED STATES PATENT OFFICE 2,670,247

RELAY VALVE FOR VACUUM BRAKE SYSTEMS

John R. Almond, Detroit, Mich., assignor to The Midland Steel Products Company, Cleveland, Ohio, a corporation of Ohio Application April 20, 1950, Serial No. 157,041

5 Claims. (Cl. 303—31)

This invention relates to relay or control valve units for initiating and controlling the application of vacuum-operated brakes.

A common application of the invention is in connection with a tractor-trailer brake installation, but it is understood that the relay valve of he invention can be used for remote control of brake systems mounted on other vehicles or structures. Relay valves of the type to which this invention relates translate a change in control pressure engendered by operation of the brake pedal to a corresponding change in pressure in pneumatically-operated brake booster cylinders. Difficulty is encountered in that prior relay valves tend to hunt about their regulating position, and with diaphragm-type relay valves this manifests itself as a flutter or chatter of the diaphragms and valves about their regulating or lapped position.

One object of the invention is to reduce or eliminate flutter of the relay valve diaphragm and valve members about the lapped position. In the preferred embodiment this is accomplished by providing a baffle adjacent the response diaphragm which traps air adjacent this diaphragm so that the latter acts as a damper and greatly reduces, or completely eliminates, flutter of the diaphragm and associated parts. This is accomplished without affecting the sensitivity of the response by providing a restricted bleed or by-pass through or around the baffle.

In many brake installations of the type to which this invention relates, it is customary to provide a tank or reservoir to act as a reserve or emergency source of vacuum for a remote set of brakes, to render the latter more or less independent of the instantaneous conditions existing within the vehicle engine manifold or other primary source of vacuum, and to give braking power in case of line breakage. In such installations it has been proposed to provide the relay valve with a tank check valve which isolates the tank from the associated remote brake system under most conditions of application in order that the engine need only evacuate the brake units and not the tank under these conditions.

It is an object of the present invention to render the tank isolating check valve inoperative during partial or normal brake application whereupon the tank assists to apply the brakes, but to permit the check valve to isolate the tank upon full brake application. Thus with full brake application, and under normal conditions with the lines intact and the engine running, full manifold vacuum may be applied directly to the remote system of brakes. In the preferred embodiment of the invention the above two phases of operation are accomplished by providing the relay valve with mechanical means associated with the air and vacuum valves in the relay valve that hold the tank isolating check valve away from its seat except upon full brake application.

Another object resides in increasing the sensitivity of the valve and in reducing the number of diaphragms required to attain the aforesaid results, preferably by employing no more than two diaphragms, namely a control and a response diaphragm. This is accomplished in the preferred embodiment of the invention by placing an operating rod between the two diaphragms and mounting a unitary air and vacuum valve member slidably on the rod. Thus, the operating means, namely the rod, need not be bored or chambered to form a fluid passageway as in prior designs which not only lessens the cost of producing the valve but also reduces the weight or inertia of the moving parts and hence increases the sensitivity of the valve.

It is desirable in these systems to provide a vacuum check valve between the engine manifold or other primary source of vacuum, and the relay valve, to prevent loss of vacuum in the system in case the vacuum line is broken (as by detachment of the trailer) or in case the tractor engine or other primary source of vacuum stops or is rendered inoperative. Accordingly, another object of the invention is to simplify the construction and installation of a system having such a check valve as well as to render the system more foolproof. This is accomplished by incorporating the vacuum check valve in the relay valve, in a manner that does not materially add to the cost of manufacture of the unit.

The manner in which these and other objects and advantages are accomplished will be apparent to those skilled in the art from the following detailed description of a preferred embodiment of the invention.

In the drawings:

Fig. 3 is a section thereof taken on 3—3 of Fig. 2;

Fig. 4 is a section of the valve taken on 4—4 of Fig. 2 with the valve in the brakes released position;

Figs. 5 and 6 show sections like Fig. 4, and show the valve during partial brake application, in the first and second stages thereof respectively; and, Figs. 7 and 8 are similar sections showing the first and second stages of full brake application.

Figure 1:
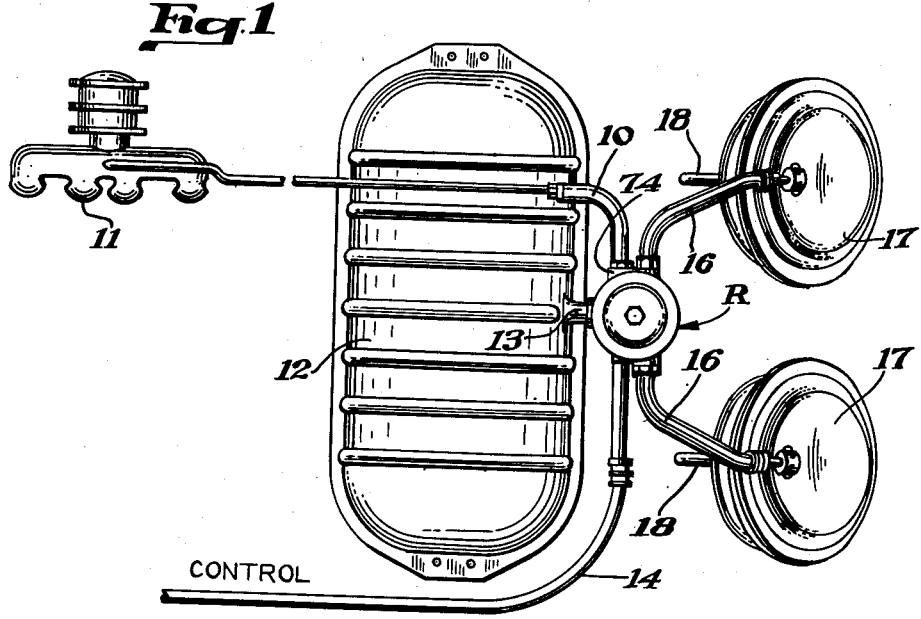
Fig. 1 is a schematic diagram of how the relay valve may be connected in the vacuum-operated trailer brake system.
Figure 2:
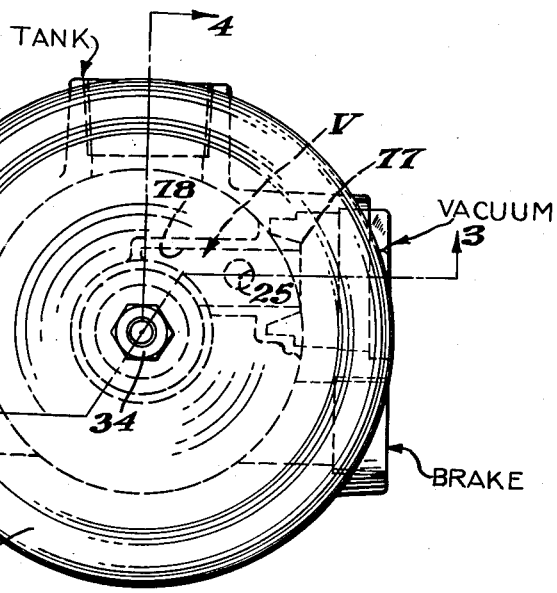
Fig. 2 is a plan view of the valve.

A typical application of the relay valve is shown diagrammatically in Fig. 1. The valve R is connected to a primary source of vacuum, such as the manifold of an internal combustion engine by means of vacuum line 10, an engine manifold being illustrated diagrammatically as at 11. Although it is understood that in the strict sense a vacuum is in reality a completely evacuated chamber, in the interests of conciseness and in accordance with common usage in the art, when the term "vacuum" is used it will be employed to denote a variable pressure less than atmospheric. Returning to Fig. 1, it is customary to employ a vacuum reservoir or tank 12 which is connected by means of a suitable connection 13 to the relay valve R. Control line 14 connects to the relay valve and in the usual application returns to a pedal-controlled booster unit on the tractor unit.

The system illustrated is arranged so that with the brakes released, maximum vacuum (minimum pressure) exists in the control and manifold lines. When the brakes are applied at the tractor, air is admitted to the control line so that the vacuum decreases (pressure increases) therein. A pair of flexible brake lines 16 are connected between the relay valve and the vacuum-operated motors or cylinders 17 which, in the illustrated application, connect by means of rods 18 to brake mechanism on the trailer wheels.

The major constructional details of a preferred relay valve unit will now be described with reference to Figs. 3 and 4. Figs. 3 and 4 show the construction of a preferred form of relay valve unit, Fig. 3 showing the valve in its lapped position, that is with the brakes applied and held, and Fig. 4 being a different section showing the valve in the brakes released position. The relay valve R includes a main housing or body member 20, preferably formed as a cored casting. Cast into the body is a chamber B which communicates with a pair of opposed ports for connection to the brake lines 16, only one port appearing in the figure. Also, in the body is a tank chamber T which communicates by a port with connection 13 (Fig. 1) to the vacuum tank. A third chamber V is cast into the body and forms a vacuum chamber which is normally in communication with the engine manifold through line 10. A portion of vacuum chamber V is bounded by a central skirt portion 21 cast into the valve body. A lower portion of the relay valve is closed off by a sheet metal plate 22 and fastened to posts 23 and 24 by suitable screws, which plate defines the lower wall of the tank chamber T. A second vacuum chamber V1 is formed between plate 22 and a control diaphragm D, and as seen in Fig. 3, a passageway 25 in the post 24 establishes communication between the first vacuum chamber V and the second vacuum chamber V1.

Diaphragm D, which may be called a control diaphragm, is clamped in place against the lower portion of the valve body by means of lower cover or housing member 26 and retained by suitable fasteners or screws 27. The housing 26 and the lower diaphragm D form a control chamber C which includes suitable means for connection with the control line 14 shown in Fig. 1. The control diaphragm D is fastened to a stiffening plate 28 which is centrally socketed as at 29 for engagement with an operating rod.

An upper cover in the form of stamping 30 is fastened by means of screws 31 to the valve body and retains an upper or response diaphragm D1 which latter defines the upper wall of the brake chamber B. Stamping 30 is pierced as at 32 to provide an air inlet above diaphragm D1. In order to exclude dirt and moisture a cover 33 is fastened to the upper plate 32 by suitable fastening means 34, and the air inlet is further protected by an annular screen 36.

The response diaphragm D1 has riveted thereto a composite air port member made up of members 40 and 41 riveted together about a central aperture in the rubber diaphragm. Member 41 is pierced as at 42 to provide for the entry of air and is socketed as at 43 to receive the upper end of the control rod. Member 40 is turned upwardly as at 44 to provide an air inlet port movable with the response diaphragm D1. Thus, the portion of the valve above port 44 may be considered as forming an air inlet chamber A. Member 40, movable with diaphragm D1, includes a depending skirt 46 which forms part of the damping structure to be described presently.

A central guide bushing 49 is cast in the body and slidably receives the valve operating rod 50, the ends of which rest in the sockets in the upper and lower diaphragm plates.

A tank check valve 51 is slidedly mounted on rod 50 and formed for engaging the lip 52, the latter forming a vacuum port between the vacuum chamber V and the tank chamber T. A shoulder 53 on rod 50 is arranged to hold the tank check valve 51 in its open position against the action of a closing spring 54 except on full brake application.

Combined air and vacuum valve means 60 are slidably mounted on the control rod 50 and although the air and vacuum valve means may be made up of several parts, they are unitary in operation. An air valve disc 61 is formed for engagement with the air inlet port 44, and beneath this, but movable (or unitary) with it, is a vacuum valve disc 62, the latter being formed for engagement with a vacuum port 63 which establishes communication between the vacuum chamber V and the brake chamber B. A rod seal 64 is mounted in the valve member 60 for preventing escape of air around the rod 50. A spring 66 extends and reacts between the plate 40 (movable with the response diaphragm D1) and the combined valve member 60, which spring tends to close the vacuum port 63 by causing the vacuum valve 62 to engage its seat.

The damping structure includes, in the preferred construction, a metal disc 70 pressed into place in the body and mounting an annular rubber-like ring 71 having an inwardly projecting lip 72 for sealing engagement with the skirt 46 movable with the diaphragm D1. One or more equalizing apertures 73 (Fig. 4) may be formed in the disc 70 so that the pressures above and below the disc 70 may become equalized.

It is a feature of the invention that a vacuum check valve is incorporated in the relay unit. As seen in Fig. 3, the port or fitting 74 which makes connection with the vacuum line 10 leading to the engine manifold, is separately threaded into the body to permit the installation of a vacuum check valve 75. This valve is normally held open by means of spring 76 but may engage a vacuum check valve seat 77 surrounding a passage 78 leading to the vacuum chamber V. The vacuum check valve 75 is non-circular in outline so that air may pass about its periphery when it is unseated.

Operation—brakes released position

Referring to Fig. 4, in the brakes released position maximum vacuum (minimum pressure) exists in the control chamber C. With this condition, the natural resilience of the response diaphragm $D_1$ plus the weight of the diaphragm retainer assembly will hold the seat 44 of the air port off the air valve 61 so that the brake chamber B is open to atmsophere. Simultaneously, spring 66 forces the vacuum valve 62 against the vacuum port 63 blocking communication between the vacuum and brake chambers. With rod 50 down, shoulder 53 holds open the tank check valve 51 so that the engine manifold is connected directly to the tank chamber and hence exhausts the tank. Thus, the tank is at full vacuum and the brake lines are at full atmospheric pressure, and since in this embodiment the brake operators 17 are of the air-suspended type the trailer brakes will be released. By means of passageway 25 full vacuum also exists in the second vacuum chamber $V_1$ so that pressure above and below the control diaphragm D is balanced.

Partial application—first stage

Referring to Fig. 5, if the operator wishes to make a partial brake application he depresses his brake pedal or operates a hand control lever, which admits air to the control chamber C causing the pressure to rise therein. This lifts the control diaphragm D which by means of rod 50 lifts the response diaphragm $D_1$. The diaphragms are arranged so that in the brake released position, upward motion thereof is opposed only by their natural resiliency, it being recalled that in the brake released position a vacuum exists above and below the lower control diaphragm and atmospheric pressure is balanced above and below the upper response diaphragm. Thus when pressure rises below the control diaphragm D, the response diaphragm $D_1$ is lifted until the air port 44 engages the air valve 61 which closes the air port. Unless pressure in the control chamber is changed, the upward motion of the control and response diaphragms continues temporarily, lifting the vacuum valve 62 from the vacuum port 63 and opening the brake chamber B to the vacuum chamber V. A partial vacuum is now established in the brake chamber, the condition of the valve being as illustrated in Fig. 5 which initiates application of the brakes.

Partial application—second stage

With the partial vacuum established in the brake chamber and with vacuum valve 62 open as described above, pressure in the brake chamber and hence below the response diaphragm $D_1$ is reduced, and since the air valve 61 is closed atmospheric pressure above the response diaphragm $D_1$ is unbalanced, forcing the latter downwardly until the vacuum valve 62 closes. The opening and closing action just described continues for a short period of time until the pressure in the brake chamber B equals that in the control chamber C or, depending upon the relative sizes of the diaphragms and their resiliency, is a substantially direct function thereof. Under these conditions the pressure differential tending to force the response diaphragm downwardly and open the air valve, and that tending to force the control diaphragm D upwardly and open the vacuum valve, are equal and the relay valve is in what is termed its regulated or "lapped" position. The shoulder 53, under these conditions, holds the tank check valve 51 clear of its port so that the tank and manifold are in communication.

Full application—first stage

As seen in Fig. 7, when full brake application is desired the vacuum in the control chamber C is further reduced and, in fact, pressure in the control chamber is usually made equal to atmospheric pressure. This forces the control diaphragm D upwardly with a greater force than that produced for partial application. The air valve port lifts the valve member higher than before, establishing full communication between the tank, manifold and brake chambers. The volume of the tank is many times greater than that of the brake applicators 17 so that the exhausting of air from the brake applicators is largely accomplished by the tank, and, as indicated by the arrows in Fig. 7, air sweeping past the tank check valve impinges thereupon and momentarily holds the valve open thereby making it possible to take full advantage of the tank capacity to quickly and initially apply the brakes.

Full application—second stage

With the tank in full communication with the brake ports as described above, as air from the brake cylinders enters the tank pressure rises therein and flow into the tank is reduced. Thus, the impinging action of the incoming air against the tank check valve is reduced. Furthermore, the engine continues to exhaust air from vacuum chamber V so that pressure in that chamber tends to decrease. As a result of these actions, the spring 54 closes the tank reservoir check valve and isolates it from the system. Now a partial vacuum is had in the brake chamber but as the manifold further exhausts air therefrom, full vacuum is obtained both in the brake chamber and in the second vacuum chamber $V_1$ above the control diaphragm. Of course, atmospheric pressure above response diaphragm $D_1$ is tending to close the vacuum valve and open the air valve, but this diaphragm presents a smaller effective area to atmosphere than does the control diaphragm D present to the control pressure, the difference being (in the illustrated embodiment) due to the diaphragm plate 28 being larger than the diaphragm plate 40, the diaphragms themselves being flexible. For this reason, with full application the vacuum valve remains open and air valve remains closed so that the manifold continues to maintain maximum vacuum in the brake chamber. Since the tank is temporarily isolated from the system, the engine manifold need not exhaust the air from the tank, which has a comparatively large volume, so that the brakes are powerfully and quickly moved to and held in their fully-applied position. In this position it will be noted that although the shoulder 53 on the control rod has been lifted high enough so that it clears the reservoir check valve and permits it to close, the seal between the latter valve and rod 50 is not a perfect one so that so long as the parts are in the position of Fig. 8, the engine can gradually continue to exhaust the tank and restore it to full vacuum.

Emergency operation

If the manifold line 10 and the control line 14 should be broken due to a separation of tractor from the trailer, the flow of air through the broken manifold line closes check valve 75 thus sealing out atmosphere at this point. The flow of air into control chamber C causes control diaphragm to move upward and holds vacuum valve 62 open, thus allowing the tank to partially evacuate the brake chambers and remain in balance therewith. Inclusion of the vacuum check valve in the body of the relay valve simplifies installation, and since the vacuum check valve is mounted in the relay valve instead of being connected thereto by a line that might be subject to leakage or breakage, brake application on emergency is assured.

*Damping action*

Referring back to Figs. 5 and 6 which show the normal conditions, namely partial brake application, it can be seen that the lip 72 of the rubber ring 71 remains in semi-sealing engagement with skirt 46. Thus, a substantially closed chamber is formed immediately below response diaphragm $D_1$, and the air trapped therein acts as a damper and greatly reduces tendency of the diaphragm to flutter about the lapped position. An aperture 73 may be provided in the plate 70 to supplement passage of air between lip and skirt 46 in order to permit equalization of pressure above and below the plate and to regulate the damping action so that the diaphragm and baffle act somewhat like a dash pot and motion of the diaphragm is steadied.

Having completed a detailed description of a preferred embodiment of the invention it will be seen that I have not only simplified the construction and installation of the valve, but have reduced flutter at the lapped position, provided more positive control of the reservoir check valve, and by mounting the vacuum check valve in the relay valve, have made its action more foolproof.

Having thus described the present invention so that others skilled in the art may be able to understand and practice the same, I state that what I desire to secure by Letters Patent is defined in what is claimed.

What is claimed is:

1. A control valve for a vacuum brake system comprising a body member having vacuum, control and brake connections, a vacuum chamber, a control chamber partly defined by a control diaphragm, and a brake chamber, a response diaphragm partly defining said brake chamber and exposed to atmospheric pressure, a fixed wall between said vacuum chamber and said brake chamber and having a vacuum port, an air port in said response diaphragm, unitary air and vacuum valve means for said air and vacuum ports, resilient means associated with said response diaphragm and said valve means for normally closing said air port and closing said vacuum port, mechanical operating means extending through said unitary valve means and said ports and engaging said control and response diaphragms, packing in said unitary valve means surrounding and engaging said mechanical operating means to prevent the passage therebetween of air from outside of the response diaphragm into said vacuum chamber, said unitary valve means and packing being movable relative to said mechanical operating means only during the opening and closing of said air port and being movable at all other times with said operating means.

2. A control valve for a vacuum brake system comprising a body member having vacuum source, reservoir, control and brake connections, a first vacuum chamber, a reservoir chamber, and a reservoir port between said chambers, a second vacuum chamber and a control chamber formed in said body with a control diaphragm between said latter chambers, means establishing communication between said vacuum chambers, a brake chamber formed in said body, a response diaphragm partly defining said brake chamber and exposed to atmospheric pressure, a vacuum port between said first vacuum chamber and said brake chamber, an air port in said response diaphragm, air and vacuum valve means for said air and vacuum ports, resilient means associated with said response diaphragm and said valve means for normally closing said air port and closing said vacuum port, an endwise movable rod extending between said control and response diaphragms and engaging them at its ends, a check valve for the reservoir port normally held open by said rod, and resilient means for moving said check valve to closed position when the said rod is moved to the end of its stroke by application of full atmospheric pressure to said control chamber.

3. A control valve for a vacuum brake system comprising a body member having vacuum source, reservoir, control and brake connections, a first vacuum chamber, a reservoir chamber, and a reservoir port between said chambers, a second vacuum chamber and a control chamber formed in said body with a control diaphragm between said latter chambers, means establishing communication between said vacuum chambers, a brake chamber formed in said body, a response diaphragm partly defining said brake chamber and exposed to atmospheric pressure, a vacuum port between said first vacuum chamber and said brake chamber, an air port in said response diaphragm, air and vacuum valve means for said air and vacuum ports, resilient means associated with said response diaphragm and said valve means for normally closing said air port and closing said vacuum port, a check valve for said reservoir port, an endwise movable rod extending through said air and vacuum valve means and engaging said control and response diaphragms at its ends, packing in said vacuum valve means surrounding and engaging said rod to seal against flow of air therebetween, said packing moving with said rod at all times except only during the opening and closing of the air port when the packing moves relative to said rod, means on said rod to engage said check valve and hold it open normally, and spring means engaging said check valve and operative to move the latter to close said reservoir port when full atmospheric pressure is applied to said control chamber.

4. A control valve for a vacuum system comprising a body having vacuum, reservoir, control and brake connections, a first vacuum chamber formed in said body, a reservoir chamber formed in said body, a reservoir port between said chambers, a second vacuum chamber and a control chamber formed in said body with a control diaphragm therebetween, means establishing communication between said vacuum chambers, a brake chamber formed in said body, a response diaphragm partly defining said brake chamber and exposed to atmosphere pressure, a fixed wall between said first vacuum chamber and said brake chamber, a vacuum port in said fixed wall, an air port in said response diaphragm, integral air and vacuum valve means for said air and vacuum ports for normally closing said air port and closing said vacuum port, rod means engageable at one end with said control diaphragm and at the other end with said response diaphragm, said rod means extending through said ports and being movable independently of said air and vacuum valve means only during the opening and closing of the air port, and a reservoir check valve for said reservoir port movable relative to said rod means, shoulder means on said rod means for normally holding said reservoir check valve open, said rod and shoulder means being lifted clear of said reservoir check valve upon supplying full atmospheric pressure to the control chamber, and spring means urging said reservoir check valve toward said reservoir port whereby the latter is closed upon supplying full atmospheric pressure to the control chamber.

5. A brake relay valve comprising a hollow body having an air chamber at one end, a control chamber at the other end and a vacuum chamber between said chambers, a diaphragm between said air and vacuum chambers and having an air port, a diaphragm between said control and vacuum chambers, a partition in said vacuum chamber having a vacuum port and a reservoir port therein, said air, vacuum and reservoir ports being arranged in line, a rod between and engaging said diaphragm at its ends and extending through said air, vacuum and reservoir ports, a vacuum valve on said rod to engage said vacuum port, packing in said vacuum valve surrounding and engaging said rod to seal against air flow around the rod, an air valve carried by said vacuum valve to close said air port, a check valve for said reservoir port on said rod, a stop on the rod for said check valve, rigid means around and guiding said rod in its endwise movements, and a spring around said rod and compressed between said check valve and said rigid means for urging said check valve toward the reservoir port, said air, vacuum and check valves moving with said rod in its endwise movements except only during the opening and closing of the air port when the air and vacuum valves move relative to said rod, said check valve closing said reservoir port upon application of full atmospheric pressure.

JOHN R. ALMOND.

References Cited in the file of this patent

UNITED STATES PATENTS

| Number | Name | Date |
|---|---|---|
| 2,024,687 | Farmer | Dec. 17, 1935 |
| 2,049,984 | Vorech et al. | Aug. 4, 1936 |
| 2,155,226 | Rensham | Apr. 18, 1939 |
| 2,219,062 | Almond et al. | Oct. 22, 1940 |
| 2,275,338 | Andres et al. | Mar. 3, 1942 |
| 2,358,644 | Kelley | Sept. 19, 1944 |
| 2,429,196 | Price | Oct. 14, 1947 |